(12) United States Patent
Neuhaus et al.

(10) Patent No.: US 8,191,418 B2
(45) Date of Patent: Jun. 5, 2012

(54) METHOD AND MEASURING SYSTEM FOR DETERMINING AND/OR MONITORING AN AGGREGATE STATE CHANGE OF A MEASURED MEDIUM ON A THERMAL, FLOW MEASURING DEVICE

(75) Inventors: Markus Neuhaus, Frick (CH); Michel Wagner, Basel (CH)

(73) Assignee: Endress + Hauser Flowtec AG, Reinach (CH)

( * ) Notice: Subject to any disclaimer, the term of this patent is extended or adjusted under 35 U.S.C. 154(b) by 323 days.

(21) Appl. No.: 12/588,820

(22) Filed: Oct. 29, 2009

(65) Prior Publication Data

US 2010/0147068 A1   Jun. 17, 2010

(30) Foreign Application Priority Data

Nov. 19, 2008  (DE) .................. 10 2008 043 887

(51) Int. Cl.
*G01F 1/68* (2006.01)
(52) U.S. Cl. ...................... 73/204.23; 702/45
(58) Field of Classification Search .................. None
See application file for complete search history.

(56) References Cited

U.S. PATENT DOCUMENTS

| | | | |
|---|---|---|---|
| 6,340,243 B1 | 1/2002 | Deane et al. | |
| 6,964,710 B2 * | 11/2005 | Hecht et al. | 134/16 |
| 6,983,734 B2 * | 1/2006 | Muto | 123/308 |
| 2006/0235629 A1 | 10/2006 | Walker | |
| 2007/0113644 A1 | 5/2007 | Manaka | |

FOREIGN PATENT DOCUMENTS

| | | |
|---|---|---|
| EP | 1 329 715 A2 | 7/2003 |
| WO | WO 95/32406 | 11/1995 |
| WO | WO 01/20269 A1 | 3/2001 |

* cited by examiner

*Primary Examiner* — Harshad Patel
(74) *Attorney, Agent, or Firm* — Bacon & Thomas, PLLC

(57) ABSTRACT

A method for determining and/or monitoring aggregate state changes on a thermal, flow measuring device of at least a first part of a measured medium, wherein, as a result of the temperature of the medium being measured, as a result means of the chemical composition of the medium being measured and as a result of the partial pressure of the at least first part of the medium being measured and/or as a result of the total pressure of the medium being measured, at least one phase boundary line of the at least first part of the medium being measured is ascertained. At least a first measurement signal is provided from a temperature difference between a first temperature sensor and a second temperature sensor of the thermal, flow measuring device and/or from a heating power supplied the medium being measured, wherein, in the case of a state of the at least first part of the medium being measured in the region of the phase boundary line of the first part of the medium being measured, disturbances of predetermined type in the measurement signal are detected as aggregate state changes on the thermal flow device of the at least first part of the medium being measured.

11 Claims, 4 Drawing Sheets

METHOD AND MEASURING SYSTEM FOR DETERMINING AND/OR MONITORING AN AGGREGATE STATE CHANGE OF A MEASURED MEDIUM ON A THERMAL, FLOW MEASURING DEVICE

TECHNICAL FIELD

The present invention relates to a method for determining and/or monitoring aggregate state changes on a thermal, flow measuring device of at least a first part of a measured medium, wherein at least a first measurement signal is provided from a temperature difference ($\Delta T$) between a first temperature sensor and a second temperature sensor of the thermal, flow measuring device and/or from a heating power (Q) supplied the medium being measured is provided.

BACKGROUND DISCUSSION

Thermal flow measurement rests essentially on two measuring principles, the thermal dispersion measuring principle and the thermal profile, or temperature rise, measuring principle. In the case of thermal dispersion, a heated measuring element is exposed to the flow of the medium being measured. The cooling rate caused thereby is a measure for the flow velocity. In the case of measuring by means of thermal profile, or temperature rise, in a limited region of the flow, heat is introduced, whereby the temperature increases locally, from which, in turn, taking into consideration the supplied energy, the mass flow can be calculated. In such case, two temperature sensors measure the temperatures of the medium at two different points, most often, before and after the supplied heat. Also, a number of heating elements and temperature sensors can be applied, in order to obtain a better picture of the thermal profile.

In the case of both measuring methods, the sensors can be placed in the main line or in a bypass. The two principles of functioning overlap significantly in practice.

Conventional thermal, flow measuring devices for industrial processes use usually two, as much as possible equally embodied, temperature sensors, which are arranged in, most often, pin-shaped, metal sleeves, so-called stingers, and which are in thermal contact with the medium flowing through a measuring tube or through the pipeline. In such case, the two temperature sensors are usually installed in a measuring tube; the temperature sensors can, however, also be mounted directly in the pipeline. One of the two temperature sensors is a so-called active temperature sensor, which is heated by means of a heating unit. Provided as heating unit is either an additional resistance heating element, or the temperature sensor itself is a resistance element, e.g. an RTD (Resistance Temperature Device) sensor, which is heated by conversion of electrical power, e.g. by a corresponding variation of the measuring electrical current. Recently, also thin film, resistance elements, so-called Thin Film Resistance Temperature Devices (TFRTD) are used. The second temperature sensor is a passive temperature sensor and measures the temperature of the medium.

Usually, in a thermal, flow measuring device, the heatable temperature sensor is so heated, that a fixed temperature difference is established between the two temperature sensors. Alternatively, it is also known to supply a constant heating power via a control unit (open, or closed, loop control).

If there is no flow in the measuring tube, then an amount of heat constant with respect to time is required to maintain the predetermined temperature difference. If, in contrast, the medium being measured is moving, then the cooling of the heated temperature sensor is essentially dependent on the mass flow of the medium flowing past. Since the medium is colder than the heated temperature sensor, heat is transported away from the heated temperature sensor by the flowing medium. In order, thus, in the case of a flowing medium, to maintain the fixed temperature difference between the two temperature sensors, an increased heating power is required for the heated temperature sensor. The increased heating power is a measure for the mass flow, i.e. for the mass flow of the medium, through the pipeline.

If, in contrast, a constant heating power is fed in, then the temperature difference between the two temperature sensors lessens as a result of the flow of the medium. The particular temperature difference is then a measure for the mass flow of the medium through the pipeline, or through the measuring tube.

There is, thus, a functional relationship between the heating energy needed for heating the temperature sensor and the mass flow through a pipeline, or through a measuring tube. The dependence of the heat transfer coefficient on the mass flow of the medium through the measuring tube, or through the pipeline, is utilized in thermal, flow measuring devices for determining the mass flow. Devices, which operate on this principle are available from the assignee under the marks, 'tswitch', 'ttrend' or 'tmass'.

Thermal flow measuring devices are suited especially for flow measurement of gases, or gas mixtures. If, now, a gas, or a part of a gas, condenses or desublimes on the heated temperature sensor of the thermal, flow measuring device, the measurement signal of the thermal, flow measuring device changes. A measurement peak occurs, and, in the case of an uncorrected measurement signal, an error results in the measured flow. The heat transfer of liquid or solid to temperature sensor is different from the heat transfer of gas to temperature sensor. Through the condensate, or the desublimate, additional heat is withdrawn from the thermal, flow measuring device. The thermal, flow measuring device readjusts, i.e. the heating power, and, therewith, the heat energy, supplied to the medium rises. On the basis of these reactions, the thermal, flow measuring device gives a flow, which does not correspond to the flow of the gas flowing through the measurement line. There is an error in the flow signal. To be viewed as another error source is the occurring heat of condensation, or desublimation, as the case may be. Thus, an aggregate state change of the medium being measured, or of a part of the medium being measured, with the thermal, flow measuring device can be classified as a disturbance. Therefore, it is, to this point in time, only possible, to determine and/or to monitor the flow of dry gas highly accurately with a thermal, flow measuring device.

SUMMARY OF THE INVENTION

An object of the invention is to provide a method, with which such aggregate state changes can be recognized.

The object is achieved by a method for determining and/or monitoring aggregate state changes of at least a first part of a measured medium on a thermal, flow measuring device, wherein, by means of the temperature of the medium being measured, by means of the chemical composition of the medium being measured and by means of the partial pressure at least of the first part of the medium being measured and/or by means of the total pressure of the medium being measured, at least one phase boundary line at least of the first part of the medium being measured is ascertained, and wherein at least a first measurement signal from a temperature difference ($\Delta T$)

between a first temperature sensor and a second temperature sensor of the thermal, flow measuring device and/or from a heating power (Q) supplied to the medium being measured is provided, wherein, in the case of a state at least of the first part of the medium being measured in the region of the phase boundary line of the first part of the medium being measured, disturbances in the measurement signal of predetermined type are recognized as aggregate state changes on the thermal flow device at least of the first part of the medium being measured.

The method is e.g. suitable, for determining and/or for monitoring both condensate formation and/or desublimate formation on the thermal, flow measuring device at least of parts of an otherwise gaseous medium being measured, as well as also for determining and/or for monitoring evaporation and/or sublimation of the condensate, or solid formed on the thermal, flow measuring device. The terms condensate and liquid, sublimate and gas, desublimate and solid are provided, in such case, with their known meanings.

The medium being measured can, in such case, be a pure material or a mixture of at least two different chemical elements or chemical compounds. The different pure materials of a mixture are the components. These can be present in a heterogeneous mixture in phases separate from one another and in a homogeneous mixture mixed on a molecular plane and, therewith, forming a single phase. A component can, in such case, be distributed over a number of phases, i.e. not all molecules of a component are in a single phase, but, instead they can be divided over a number of phases. Also a phase can, in turn, be divided. A phase need not, for example, completely undergo an aggregate state change, but, instead, also parts of the phase can change their aggregate state. If, now, e.g. a part of a heterogeneously mixed medium being measured changes its aggregate state, then that does not mean that the aggregate state of a phase or even a component of the mixture changes, but, instead it means, that at least the aggregate state of a part of a phase of a component of the mixed medium being measured changes. The molecules of the originally one phase are, after the change of only of a part of the originally one phase, now distributed over at least two phases separated by phase interfaces, wherein at least one phase has an aggregate state different from the original phase.

The temperature of the medium being measured is ascertained by the thermal, flow measuring device itself. Data concerning the chemical composition of the medium being measured, the partial pressure of the relevant part of the medium being measured and/or the total pressure of the medium being measured are/is provided by the operator or are/is ascertained by external and/or integrated measuring devices and made available to the thermal, flow measuring device. Thus, these data are to be viewed as known.

The disturbances in the measurement signal from temperature difference ($\Delta T$) and/or heating power (Q) brought about by aggregate state changes on the thermal, flow measuring device at least of a part of the medium being measured are of predetermined type. They are distinguished, thus, by certain features and possess special properties. These features, or properties, are, however, dependent on different variables, such as the composition of the medium being measured, the pressure, the temperature or e.g. the drop size of a precipitated condensate. They are detected with methods of signal processing. This part of the method could, thus, be referred to as signal processing of the measurement signal. The parameters of the signal processing for detection of the disturbances are advantageously changeable at the run time of the method.

Proceeding from the parameters considered as known, namely the composition of the medium being measured, and the pressure and the temperature of the medium being measured, the phase boundary lines of the medium being measured are ascertained according to a method known to a technically qualified person. If, now, the measurement signal has a described disturbance, brought about by aggregate state changes on the thermal, flow measuring device at least of a part of the medium being measured, when such part of the medium being measured is in a state in the region of the corresponding phase boundary line, this disturbance is recognized as an aggregate state change on the thermal, flow measuring device.

The region around the phase boundary line, in which at least the corresponding part of the medium being measured is located, in order that the disturbance be recognized as an aggregate state change, depends on different variables. The choice of the region boundaries is, thus, likewise dependent on the state variables of the medium being measured, or of its parts, as the case may be, and on additional method variables, such as e.g. the measuring frequency. If, for example, the measuring frequency is low and the probability of a fast change of state variables of the medium being measured is high, the region boundaries are made wider than in the case of a high sampling rate and less rapid changes in the state of the medium being measured. This part of the method relates to the state determination of the relevant part of the medium being measured. The method has, thus, two parts, namely the signal processing of the measurement signal and the state determination of the relevant part of the medium being measured.

As also in the case of the signal processing, the region boundaries around the phase boundary lines are parameterable at the run time of the method. A thermal, flow measuring device, in which this method is applied, is, thus, advantageously on-site parameterable.

Pressure as a state variable of the medium being measured can be determined in many ways. In the case of an ideally behaving gas, according to Dalton's law, the sum of all partial pressures of the components equals the total pressure of the mixture. The partial pressures can be very simply placed over the total pressure and exact knowledge calculated concerning the composition of the gas mixture, among other things, with the material quantity fraction of each component in the mixture. Now, most gases behave not ideally, but, instead, in a real manner. However, with sufficient knowledge of the properties of the mixture and its components, e.g. concerning the virial, or the van der Waals, coefficients, the partial pressures are estimatable. An approximation is compensatable by larger region boundaries in the signal processing of the measurement signal and/or the state determination of the relevant part of the medium being measured. The calculated or measured partial pressures of the medium being measured or the calculated or measured total pressure of the medium being measured include, in such case, dynamic pressure components. Besides the static pressure, a stagnation pressure can arise on the surface of the thermal, flow measuring device. This is, among other things, dependent on the composition and density of the medium being measured, or of its parts, and the corresponding flow velocity. In the case of compressible measured media, the dynamic pressure is, in such case, almost negligible in comparison to incompressible flows. Non-negligible dynamic pressure components are separately ascertained or are compensatable by other, or enlarged, region boundaries in the signal processing of the measurement signal and/or the state determination of the relevant part of the medium being measured.

In a first form of embodiment of the method of the invention, the thermal, flow measuring device includes two temperature sensors and a control/evaluation unit, wherein the two temperature sensors are arranged in a region of a housing facing the medium and in thermal contact with the medium being measured flowing through the measuring tube, wherein a first temperature sensor is heatably embodied, wherein a second temperature sensor provides information concerning the current temperature of the medium being measured, wherein the control/evaluation unit ascertains, on the basis of the temperature difference ($\Delta T$) between the two temperature sensors and/or on the basis of the heating power (Q) supplied to the first temperature sensor, the mass flow of the medium being measured.

In an advantageous further development of the method of the invention, the slope between two predetermined points of the first measurement signal is ascertained for detecting aggregate state changes on the thermal flow device, at least of the first part of the medium being measured. Thus, a difference quotient is formed over a certain window. The distance separation of the two points corresponds to the length of the window, which preferably is a so-called "sliding window", thus a continuously forwards rolling window. The choice of the two points is, among other things, dependent on the composition of the medium being measured and on the signal quality. The points should, thus, be on-site selectable and, therewith, variable. In such case, different limit values can hold for rising secants than for falling ones, in order to deduce the presence of an aggregate state change. A rising secant suggests, in such case, e.g. a condensation or desublimation on the thermal, flow measuring device of a part of the medium being measured, while, a falling secant means, in such case, instead, an evaporation or a sublimation. The detection of known phase transitions is, thus, very simply and rapidly possible.

An opportunity for distinguishing disturbances triggered by aggregate state changes from simple mass flow surges is accomplished in an embodiment of the invention by calculating the step response for the medium being measured, e.g. a gas mixture. Such step response has a maximum. If the disturbance in the measurement signal, as expressed especially by a peak, or an excursion, exceeds the maximum slope of the step response, the presence of an aggregate state change can be assumed.

In the case of a biogas containing 65 mol % methane and 35 mol % carbon dioxide, at a process temperature of 25° C. and a process pressure of 1050 mBar, calculation of the difference quotient with a separation distance of the discrete measurement points of 20 ms in the case of a total window length of 400 ms and a measuring frequency of 50 Hz delivers acceptable results.

Selectable as properties of the measurement signal, by means of which an aggregate state change on the thermal flow device at least of the first part of the medium being measured can be deduced, are, besides the slope of the measurement signal e.g. also the amplitude of the measurement signal, or its change in a certain time. A window is, in turn, placed on the measurement signal. If the average value of the signal changes too strongly in the window relative to the preceding windows, thus over or under a predetermined limit value, then an aggregate state change on the thermal flow device, at least of the first part of the medium being measured, can be deduced, in case simultaneously the medium being measured is located in a state in the region of its phase boundary lines.

Other signal processing methods for examining the measurement signal for disturbances are known to those skilled in the art, such as e.g. spectral analysis, in order to detect periodic processes, such as e.g. droplets oscillating on the sensor.

In the case of a very advantageous further development of the invention, the distance between the two predetermined points of the measurement signal for calculating the slope of the measurement signal is a function of the measuring frequency and the composition of the medium being measured.

A very advantageous further development of the method of the invention is that in which the presence of the disturbances in the measurement signal detected as aggregate state changes on the thermal flow device at least of the first part of the medium being measured are output at the flow measuring device. Options are to report, by means of a display, whether and when such disturbances are present, or to have a display show the user, which type of disturbance is present at the moment and/or which effect such has on the measurement signal. Along with that, a disturbance is e.g. reported also per bus to the process control system. In the case of a correction of the disturbance, e.g. the uncorrected value and/or the correction itself can be displayed.

Another advantageous further development of the method of the invention provides, that the disturbances in the measurement signal detected at the thermal flow device as aggregate state changes at least of the first part of the medium being measured are corrected.

In an advantageous further development of the method of the invention, it is provided, that a warning of a threatening aggregate state change in the process is issued. As already described, with knowledge of the pressure, the temperature and the composition of the medium being measured, the phase boundary lines of the medium being measured and its instantaneous state and therewith its instantaneous distance from the phase boundary lines can be calculated. If this happens within sufficiently short time intervals or continuously, a function of the state of the medium being measured is ascertainable and, therewith, changes in the state of the medium being measured are estimatable. Thus, an approaching aggregate state change can be recognized.

In an additional, advantageous, further development of the solution of the invention, the region, in which the instantaneous state of the medium being measured is located relative to its phase boundary lines, wherein disturbances in the measurement signal of predetermined type are recognized as aggregate state changes on the thermal flow device at least of the first part of the medium being measured, has limits, which amount to 100 mBar and/or 1° K.

In additional embodiments of the invention, the limits are, at most, 80 mBar, especially, at most, 60 mBar, especially, at most, 40 mBar, especially, at most, 20 mBar or even at 10 mBar. At the same time, the temperature limits are, at most, 0.8° K, especially, at most, 0.6° K, especially, at most, 0.4° K, especially, at most, 0.2° K or even only 0.1° K. In the case of the above example of the determining of biogas with 65 mol % methane and 35 mol % carbon dioxide, at a process temperature of 25° C. and a process pressure of 1050 mBar, limits at 50 mBar and 0.5° K are considered practical.

For correction of disturbances of the predetermined type in a measurement signal of a thermal, flow measuring device, which disturbances in the measurement signal of predetermined type are recognized as aggregate state changes on the thermal flow device of at least a first part of the medium being measured, wherein by means of the temperature of the medium being measured, by means of the chemical composition of the medium being measured and by means of the partial pressure at least of the first part of the medium being measured and/or by means of the total pressure of the medium being measured, at least one phase boundary line at least of the first part of the medium being measured is ascertained, and wherein at least the measurement signal of the thermal, flow measuring device is provided from a temperature difference ($\Delta T$) between a first temperature sensor and a second temperature sensor of the thermal, flow measuring device and/or from a heating power (Q) supplied the medium being measured, wherein, in the case of a state at least of the first part of the medium being measured in the region of the phase boundary line of the first part of the medium being measured, the disturbances in the measurement signal of predetermined type are recognized as aggregate state changes on the thermal flow device at least of the first part of the medium being measured, it is provided, that the disturbances in the measurement signal detected as aggregate state changes on the thermal flow device of at least of a first part of the medium being measured are smoothed.

An advantageous further development of the method of the invention provides that the last measured value of the measurement signal before the detected disturbance in the measurement signal is output until disturbance is no longer detected in the measurement signal. In the state of droplet formation, e.g. the last measured value of flow is locked in, until the droplets have fallen away. Alternatively to the output of a constant, measured value, also an error report could be output, that the momentarily measured flow value is possibly burdened with an error, and/or the measured value of flow could be set to zero. With these methods, it can e.g. be prevented, that a sum counter adds up a flow that is too large.

Additionally, the object of the invention is achieved by a thermal, flow measuring device for determining and/or monitoring the flow of a measured medium through a measuring tube, comprising two temperature sensors and a control/evaluation unit, wherein the two temperature sensors are arranged in a region of a housing facing the medium being measured and in thermal contact with the medium being measured flowing through the measuring tube, wherein a first temperature sensor is heatably embodied, wherein a second temperature sensor provides information concerning the current temperature of the medium being measured, wherein the control/evaluation unit, on the basis of the temperature difference ($\Delta T$) between the two temperature sensors and/or on the basis of the heating power (Q) supplied to the first temperature sensor, ascertains the mass flow of the medium being measured, wherein the thermal, flow measuring device is so embodied, that aggregate state changes on the thermal, flow measuring device of at least a first part of the medium being measured are recognizable and/or correctable and/or issuable at the flow measuring device. This is accomplished especially with the method of the invention.

In short, so long as the medium being measured is in a state in the region of the phase boundary line of the first part of the medium being measured, disturbances in the measurement signal of predeterminable type are recognized and/or output and/or corrected as aggregate state changes.

The thermal, flow measuring device of the invention is on-site parameterable in an advantageous embodiment.

A very advantageous further development of the solution of the invention is one in which the disturbances in the measurement signal of predetermined type are recognizable and/or correctable and/or issuable at the flow measuring device as aggregate state changes on a heatable temperature sensor of a thermal flow device at least of the first part of the medium being measured. The aggregate state changes at least of the first part of the medium being measured, which can lead essentially to disturbances in the measurement signal for the flow measurement, and are recognized as such, essentially happen only on the heatable temperature sensor of the thermal, flow measuring device.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
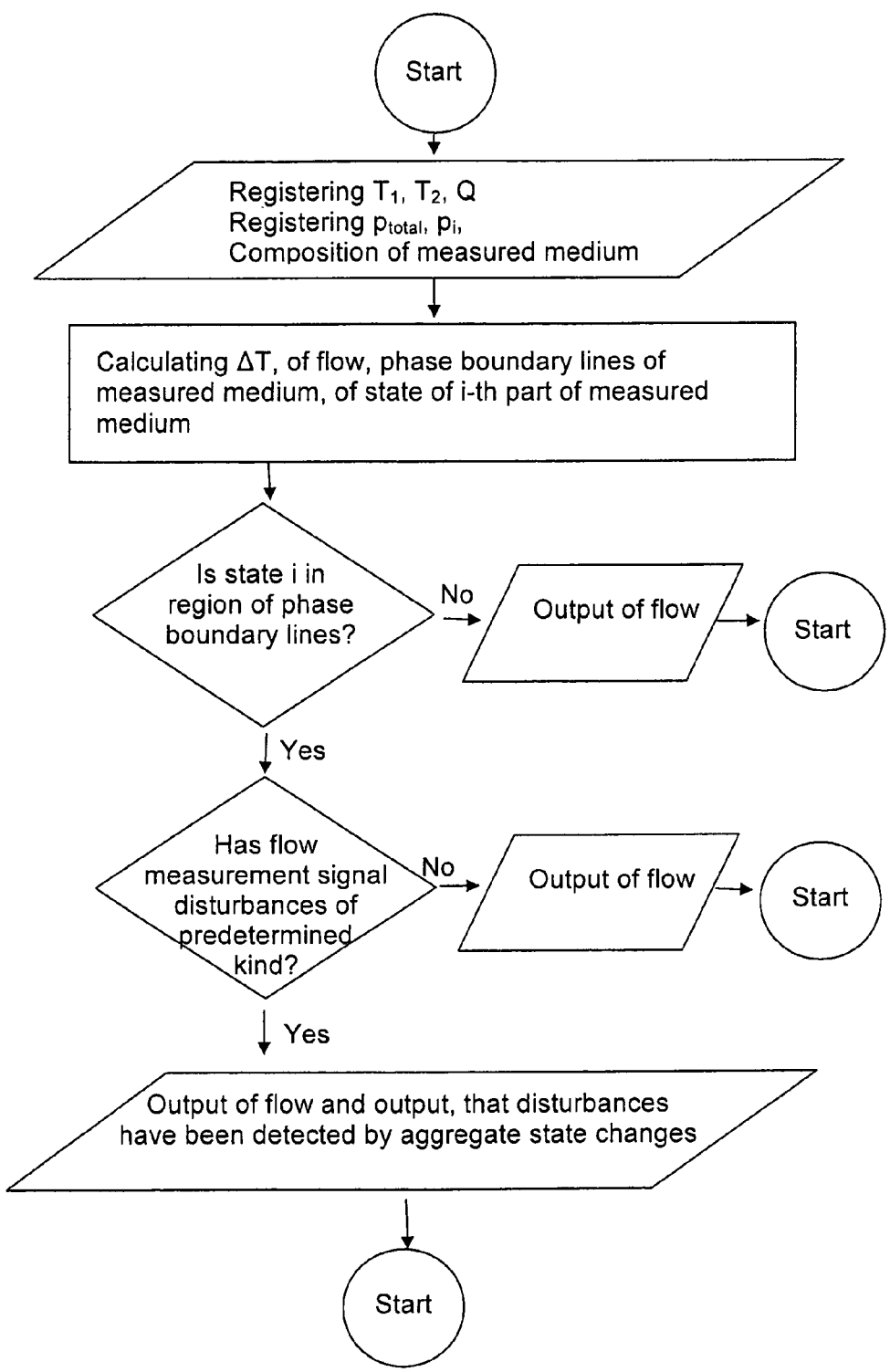
FIG. 1 is a diagram of the method of the invention.

FIG. 1 shows a diagram of a form of embodiment of the method of the invention. The temperatures $T_1$ and $T_2$ of the first temperature sensor and the second temperature sensor, respectively, are measured and therefrom the temperature difference LT between first temperature sensor and second temperature sensor calculated. Also, the supplied heating power Q is measured. The exact composition of the medium being measured is, in contrast, input by an operator or provided from an external gas analyzer. Also provided are the total pressure $p_{total}$ of the medium being measured and/or the partial pressures of the n components of the medium being measured, or the partial pressure $p_i$ the i-th part of the medium being measured. From this data, flow and phase boundary lines of the medium being measured are calculated. Moreover, the state at least of the i-th part of the medium being measured is calculated. If, now, the state of the i-th part of the medium being measured is located in the previously established region of its phase boundary lines, the measurement signal is examined for possible disturbances. If, however, the state of the i-th part of the medium being measured is not in the region of the phase boundary lines, the measured value of flow is output without other limitation. The type of disturbances, for which the measurement signal is examined, is likewise already established, or the measurement signal is examined for disturbances by means of a certain method. If the measurement signal shows no disturbances of a predetermined type, then, likewise, the flow signal is output. If, in contrast, disturbances are detected, then, supplementally to the measured value of flow, it is output that disturbances are present and, thus, the measured value of flow cannot be trusted beyond certain limits.

Figure 2:
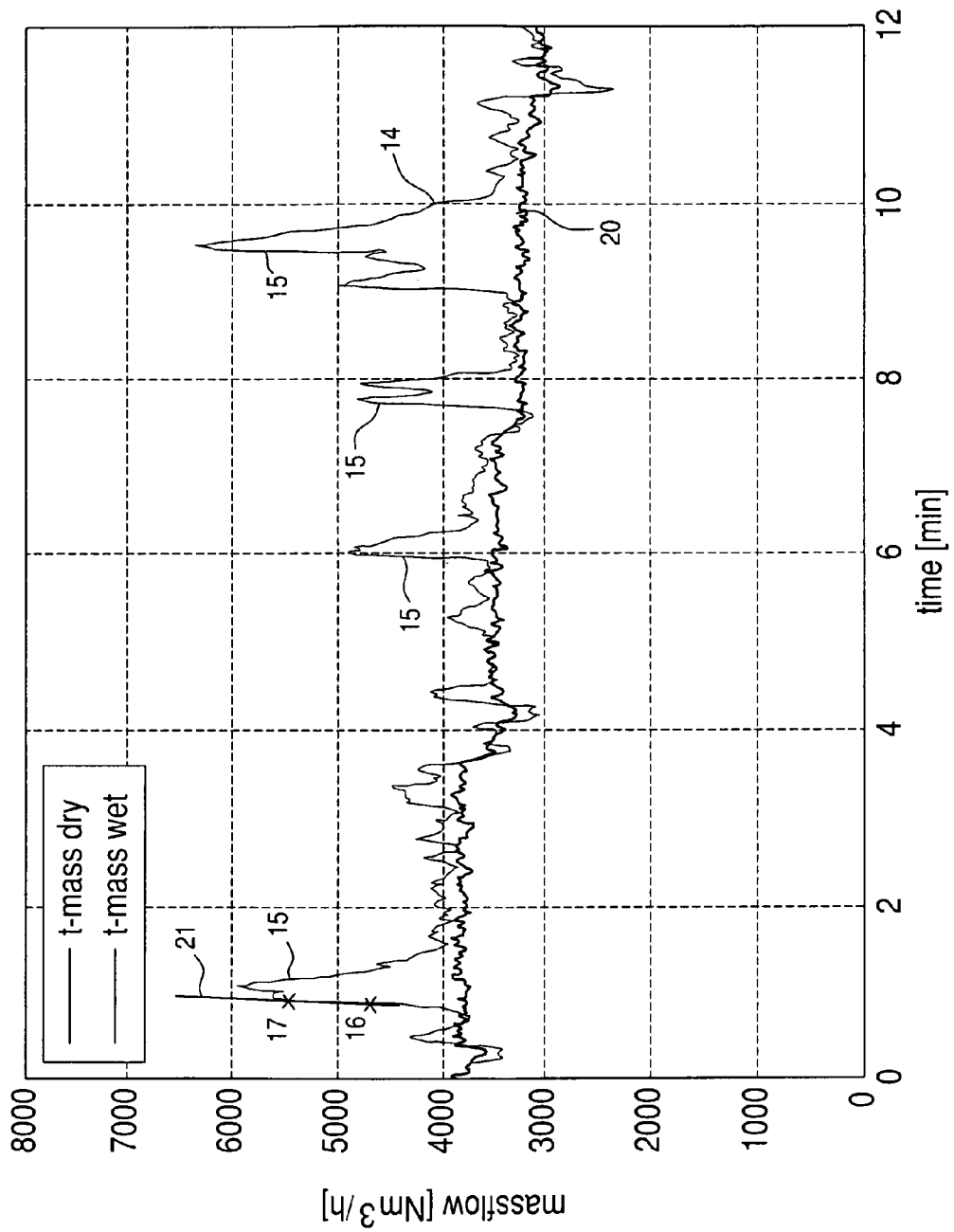
FIG. 2 is measurement signal of a thermal, flow measuring device as a function of time.

FIG. 2 shows measurement signals of a thermal, flow measuring device as a function of time. Shown is a measurement signal with disturbances 15 stemming from condensation on the temperature sensor, and an undisturbed measurement signal 20 for the same medium 3, after the medium 3, especially a fluid, was dried. The peaks in the disturbed measurement signal 14 are typical for the depositing of droplets on the temperature sensors. These are recognized, or detected, by the slope of a secant 21 between two measurement points 16, 17, which have a certain distance 18 relative to one another. Equally displayed is the end of the described aggregate state change by the now negative slope of an additional secant 21. If the slope subceeds, or falls beneath, a certain value, it can be assumed therefrom, that the measured value of flow is displayed correctly. Therebefore, however, an aggregate state change must have been recognized and then, following, it was detected that the deposited droplets had left the temperature sensor.

Figure 3:
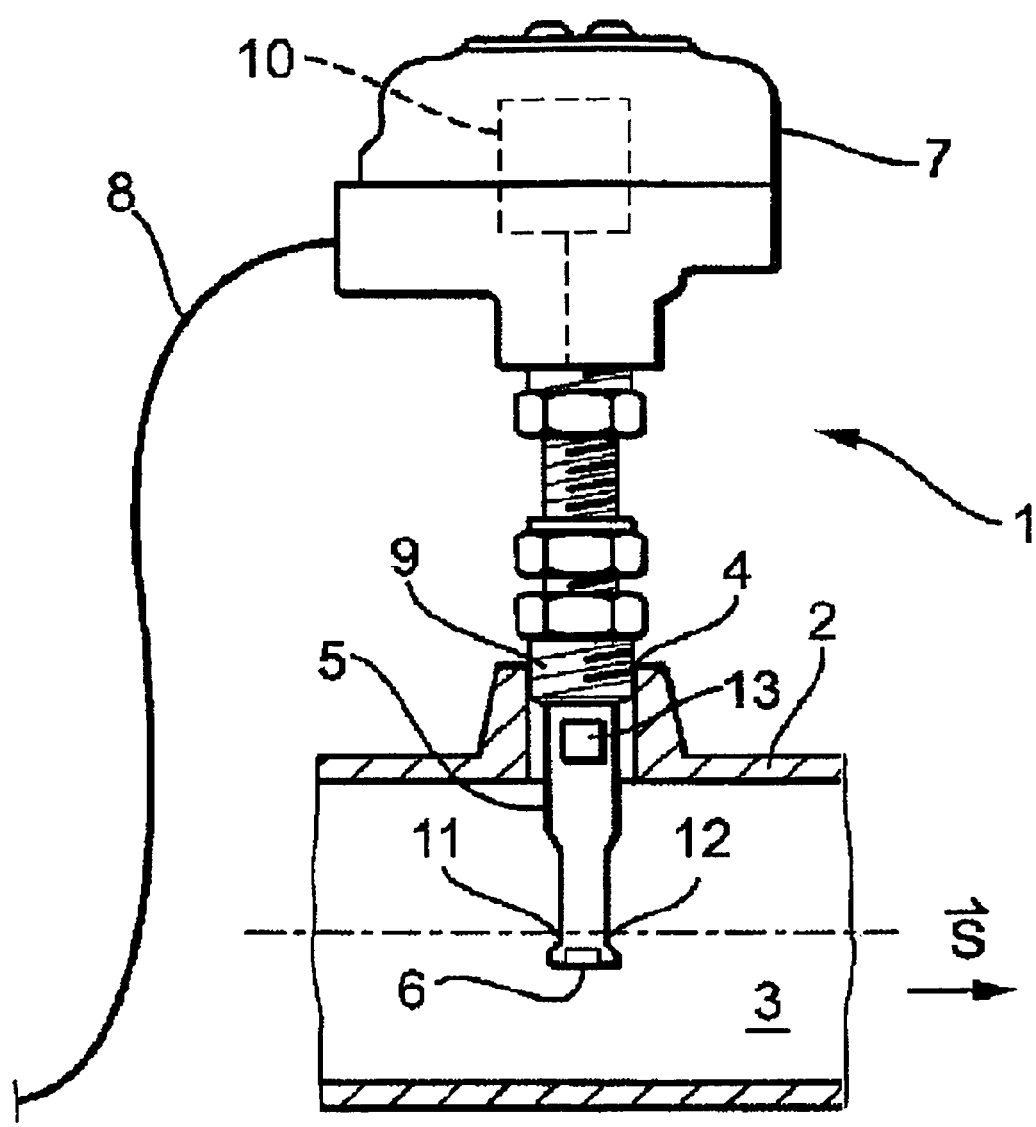
FIG. 3 is a thermal, flow measuring device of the invention.

FIG. 3 shows a schematic drawing of the thermal, flow measuring device 1 of the invention with thermal flow sensor 6 and measurement transmitter 7. The flow measuring device 1 is secured via a screw thread 9 in a nozzle 4, which is located on the pipeline 2. In the pipeline 2 is located the flowing medium 3. Alternatively, an option is to construct the flow measuring device 1 with an integrated measuring tube, such that it is an inline-measuring device.

The temperature measuring device, which is the essential part of the sensor 6, is located in the region of the housing 5 facing the medium 3. The operating of the temperature sensors 11, 12 and/or the evaluation of the measuring signals delivered by the temperature sensors 11, 12 occurs via the control/evaluation unit 10, which, in the illustrated case, is arranged in the measurement transmitter 7. Communication with a remote, control station (not separately illustrated in FIG. 3) occurs via the connection 8.

As already earlier mentioned, at least one of the two temperature sensors 11, 12 can be an electrically heatable, resistance element, a so-called RTD-sensor. Of course, in connection with the solution of the invention, also a usual temperature sensor, e.g. a Pt100 or Pt1000 or a thermocouple, can be applied, with which is associated a thermally coupled heating unit 13. The heating unit 13 is arranged in FIG. 3 in the housing 5 and thermally coupled to the heatable temperature sensor 11, 12, while, however, being largely decoupled from the medium. The coupling and the decoupling, respectively, occur preferably via filling of the corresponding intermediate spaces with thermally well conducting, or thermally poorly conducting, material, as the case may be. Preferably, suitable potting compounds are used for this.

An option with the flow measuring device 1 is to measure the mass flow continuously; alternatively, an option is to use the flow measuring device 1 as a switch, which always displays the change of a switch state, when at least one predetermined limit value is exceeded or subceeded.

Advantageously, it is, moreover, provided, that the two temperature sensors 11, 12 are heatably embodied, wherein the desired function of the first temperature sensor 11 or the second temperature sensor 12 is determined by the control/evaluation unit 10. For example, an option is that the control/evaluation unit 10 operates the two temperature sensors 11, 12 alternately as active or passive temperature sensor 11, 12 and the measured value of flow is ascertained via an averaging of the measured values delivered by the two temperature sensors 11, 12.

Figure 4:
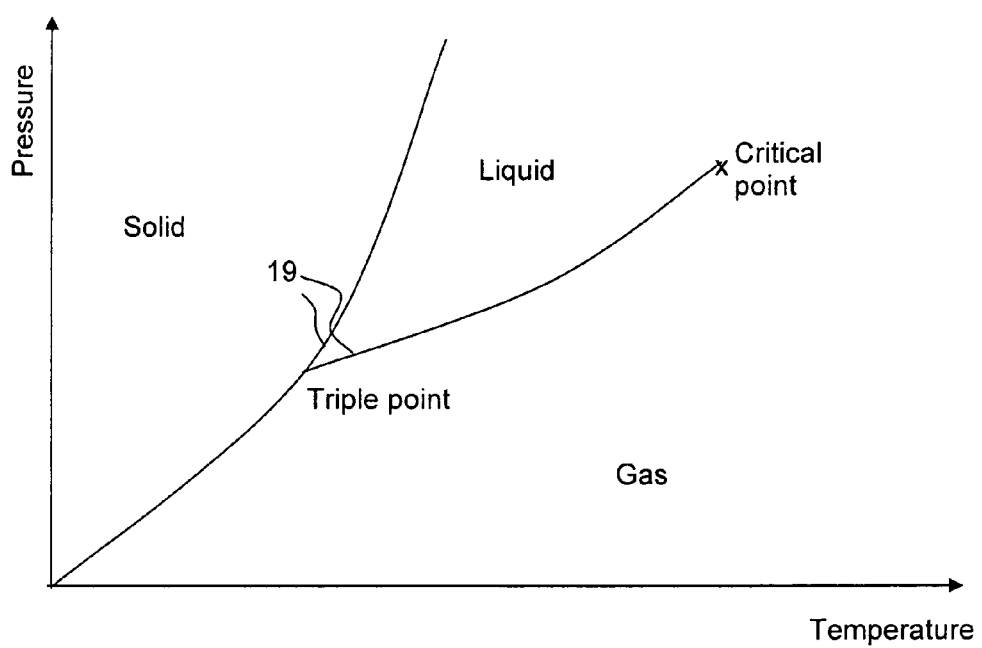
FIG. 4 is a pressure, temperature, phase diagram of a pure substance.

FIG. 4 shows a p,T-diagram, also called a phase diagram, of a pure substance without anomaly. Shown are the phase boundary lines 19 of the pure substance between the aggregate states, solid, liquid and gas. If, now, the state of the pure substance is located in a fixed region (not shown) about the phase boundary line 19, a disturbance of predetermined type in the measurement signal is recognized as an aggregate state change of the pure substance.

The invention claimed is:

1. A method for determining and/or monitoring aggregate state changes on a thermal, flow measuring device of at least a first part of a measured medium, comprising the steps of:
ascertaining at least one phase boundary line, at least of the first part of the medium, by means of temperature of the medium being measured, by means of chemical composition of the medium being measured and by means of the partial pressure at least of the first part of the medium being measured and/or by means of the total pressure of the medium being measured;
providing at least a first measurement signal from a temperature difference between a first temperature sensor and a second temperature sensor of the thermal flow measuring device and/or from a heating power supplied the medium being measured; and
in the case of a state, at least of the first part of the medium being measured, in a region of the phase boundary line of the first part of the medium being measured, disturbances of predetermined type in the measurement signal are recognized as aggregate state changes on the thermal flow device at least of the first part of the medium being measured.

2. The method as claimed in claim 1, further comprising the step of:
ascertaining the slope between two predetermined points of the first measurement signal is ascertained for detecting aggregate state changes on the thermal flow device least of the first part of the medium being measured.

3. The method as claimed in claim 2, wherein:
the distance between the two predetermined points of the measurement signal for calculating the slope of the measurement signal is a function of measuring frequency and composition of the medium being measured.

4. The method as claimed in claim 1, further comprising the step of:
outputting the presence of the disturbances in the measurement signal detected at the flow measuring device as aggregate state changes on the thermal flow device at least of the first part of the medium being measured.

5. The method as claimed in claim 1, further comprising the step of:
correcting the disturbances detected in the measurement signal as aggregate state changes on the thermal flow device at least of the first part of the medium being measured.

6. The method as claimed in claim 1, further comprising the step of:
issuing a warning before a threatening aggregate state change in the process.

7. The method as claimed in claim 1, wherein:
the region, in which the instantaneous state of the medium being measured is located relative to its phase boundary lines, wherein disturbances in the measurement signal of predetermined type are recognized as aggregate state changes on the thermal flow device at least of the first part of the medium being measured, amounts to at most, 100 mBar and/or 1° K.

8. The method for the correction of disturbances of a predetermined type in a measurement signal of a thermal, flow measuring device, which disturbances of predetermined type in the measurement signal are recognized as aggregate state changes on the thermal flow device of at least a first part of the medium being measured, comprising the steps of:
ascertaining at least one phase boundary line at least of the first part of the medium wherein by means of temperature of the medium being measured, by means of chemical composition of the medium being measured and by means of partial pressure at least of the first part of the medium being measured and/or by means of total pressure of the medium being measured;
providing at least the measurement signal of the thermal flow measuring device from a temperature difference between a first temperature sensor and a second temperature sensor of the thermal flow measuring device, and/or from a heating power supplied the medium being measured;
in the case of a state at least of the first part of the medium being measured in the region of the phase boundary line of the first part of the medium being measured, disturbances of predetermined type in the measurement signal are recognized as aggregate state changes on the thermal flow device at least of the first part of the medium being measured; and smoothing the disturbances in the measurement signal detected as aggregate state changes on the thermal flow device of at least of a first part of the medium being measured.

9. The method for correction of disturbances of predetermined type in a measurement signal of a thermal, flow measuring device as claimed in claim 8, wherein:

a last measured value of the measurement signal before the detected disturbance in the measurement signal is output, until no more disturbances are detected in the measurement signal.

10. A thermal flow measuring device for determining and/ or monitoring flow of a medium being measured through a measuring tube, comprising:

two temperature sensors; and a control/evaluation unit, wherein:

said two temperature sensors are arranged in a region of a housing facing the medium being measured and in thermal contact with medium being measured flowing through the measuring tube;

a heatable first temperature sensor;

a second temperature sensor provides information concerning current temperature of the medium being measured;

said control/evaluation unit ascertains mass flow of the medium being measured, on the basis of a temperature difference between said two temperature sensors and/or on the basis of a heating power supplied said first temperature sensor mass flow of the medium being measured; and the thermal flow measuring device is so embodied, that aggregate state changes on the thermal flow measuring device of at least a first part of the medium being measured are detectable and/or correctable and/or issuable at the flow measuring device.

11. The thermal flow measuring device as claimed in claim 10, wherein:

disturbances of a predetermined type in the measurement signal are recognizable and/or correctable and/or issuable at the flow measuring device as aggregate state changes on a heatable temperature sensor of the thermal flow device at least of the first part of the medium being measured.

* * * * *